Figure 1:
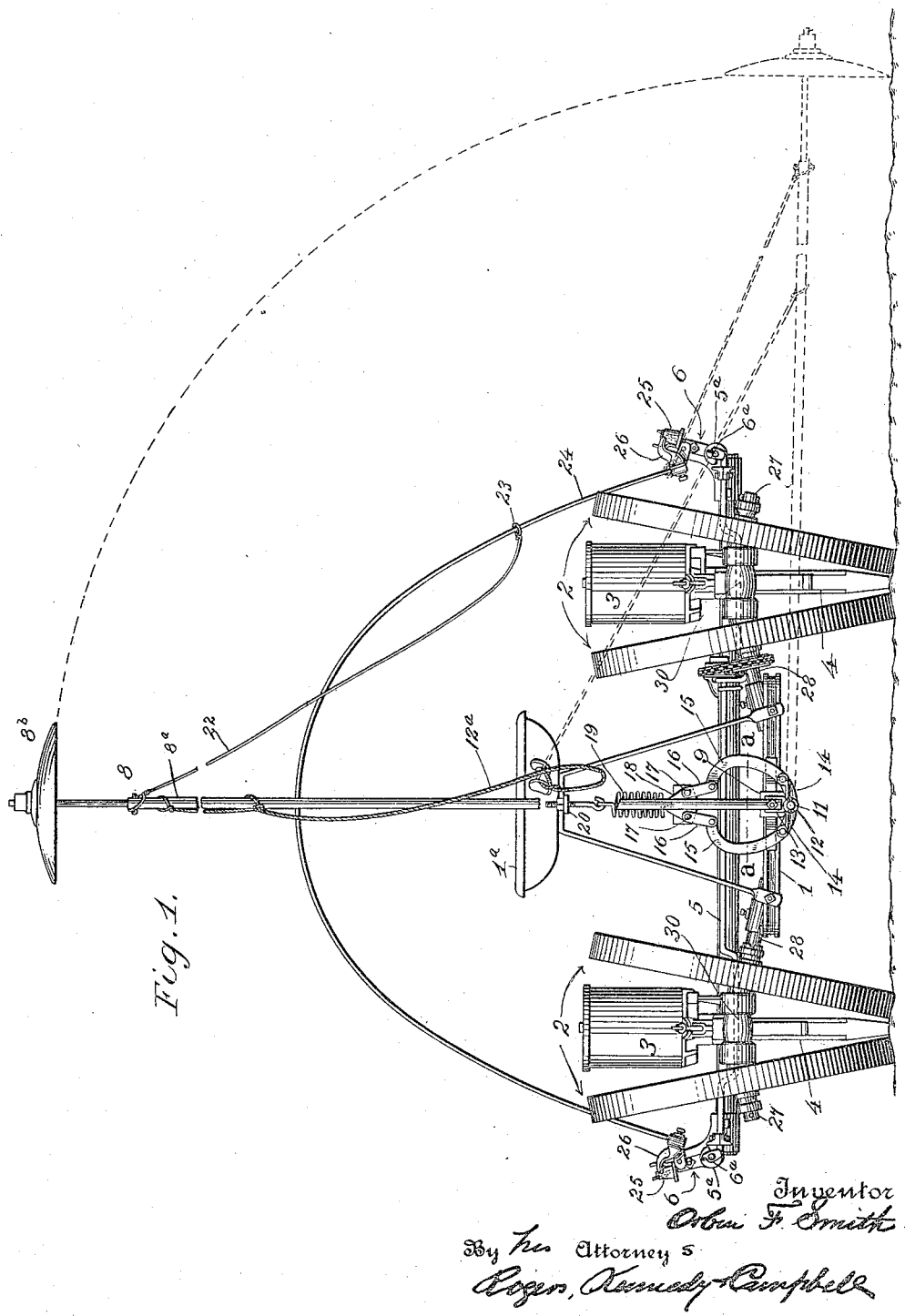

O. F. SMITH.
LAND MARKER.
APPLICATION FILED JUNE 2, 1915.
1,212,412.
Patented Jan. 16, 1917.
3 SHEETS—SHEET 2.
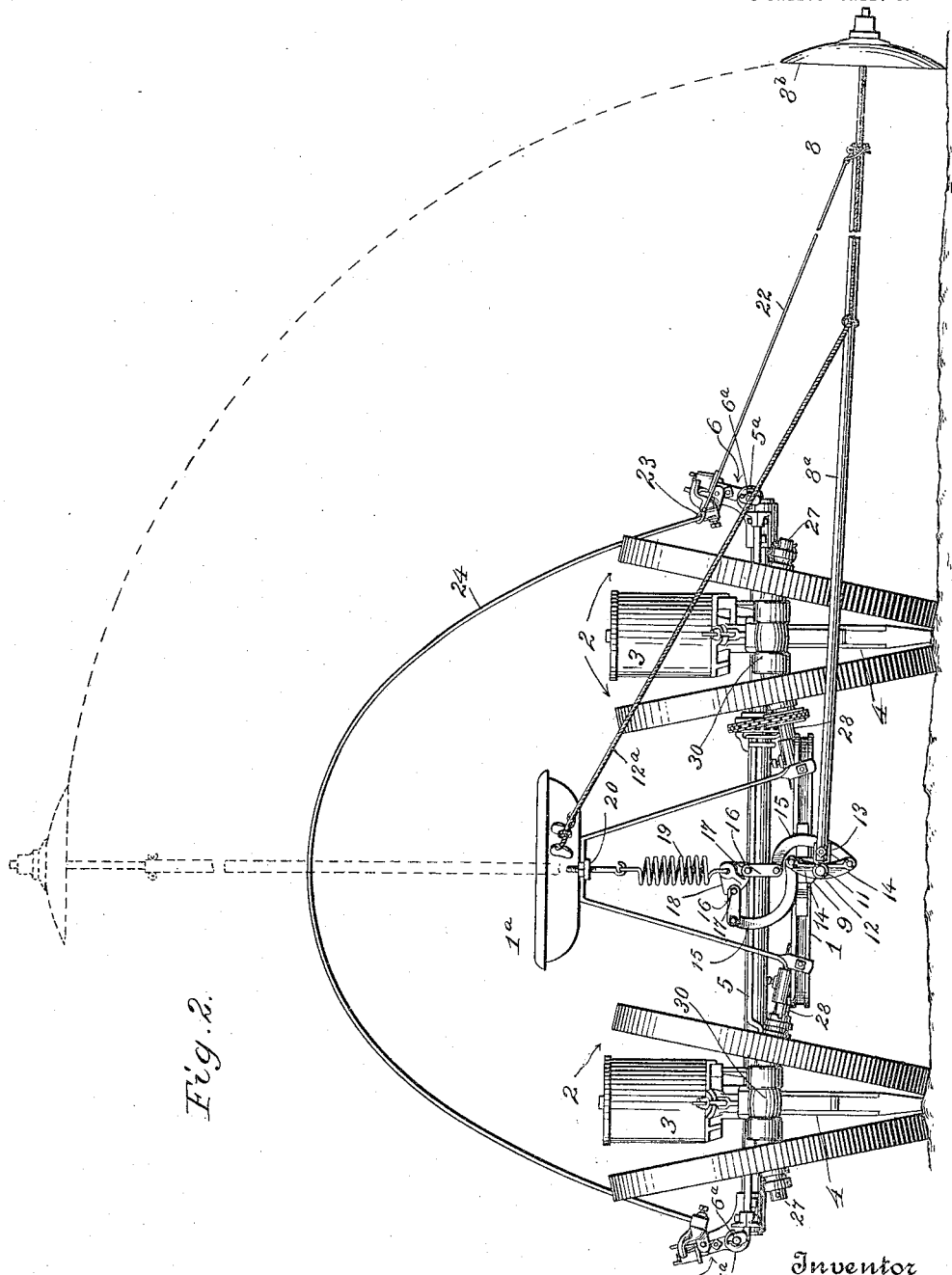
Fig. 2.

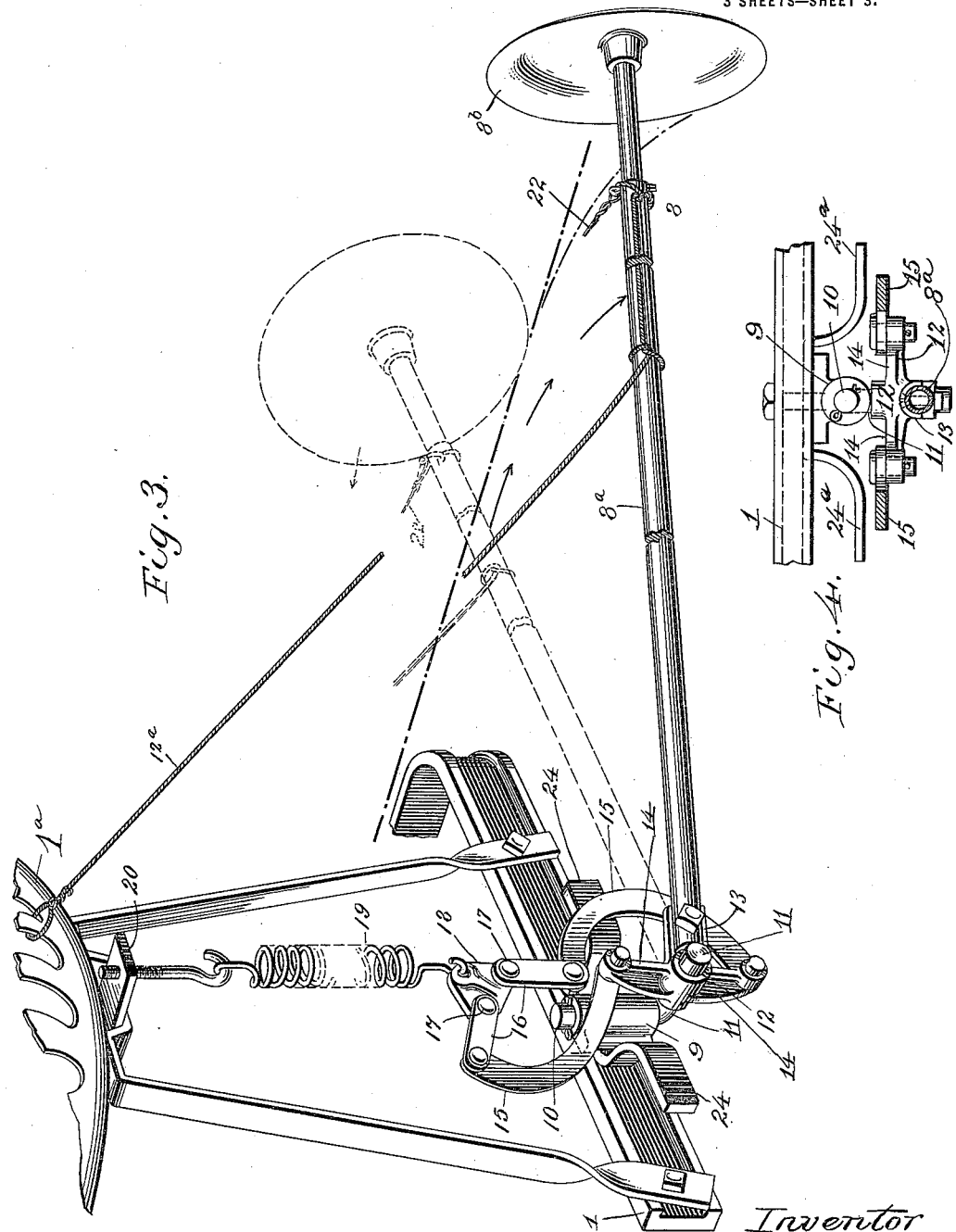

UNITED STATES PATENT OFFICE.

ORBIN F. SMITH, OF MOLINE, ILLINOIS, ASSIGNOR TO MOLINE PLOW COMPANY, A CORPORATION OF ILLINOIS.

LAND-MARKER.

1,212,412.     Specification of Letters Patent.     Patented Jan. 16, 1917.

Application filed June 2, 1915. Serial No. 31,644.

*To all whom it may concern:*

Be it known that I, ORBIN F. SMITH, a citizen of the United States, residing at Moline, in the county of Rock Island and State of Illinois, have invented certain new and useful Improvements in Land-Markers, of which the following is a specification, reference being had therein to the accompanying drawing.

This invention relates to seeding machines, and has reference more particularly to corn planting machines of the type in which a suitable frame equipped with seed discharging mechanism, operated by a check-fork and shaft through the medium of a check-wire and discharging into furrow opening runners, is sustained by two pairs of supporting covering wheels traveling behind the runners, a furrow marking device being carried by the frame and operating, as the machine advances in planting the rows, to mark the ground for the next rows.

The invention consists of various improved features of construction directed more particularly in the form and construction of the furrow marking device, to enable the same to be conveniently controlled by the driver, which improved features will be set forth in the specification to follow, and the novel parts of which will be specified in the appended claims.

In the accompanying drawings I have shown one form of embodiment of my invention by way of example, which in practice has been found to answer to a satisfactory degree the results aimed at. It will be manifest however to those skilled in the art, that the details may be variously changed and modified without departing from the limits of my invention; and further it will be understood that the invention is not limited to any particular form or construction of the parts except in so far as such limitations are specified in the claims.

Certain features of my invention are applicable particularly to corn planting machines in which the frame is supported by two pairs of ground wheels as stated; while other features of the invention are not restricted in their application to this special type of machine, as will appear in the detailed description of the construction and operation to follow.

In the accompanying drawings: Figure 1 is a rear elevation of a corn planting machine having my invention embodied therein, the marker device being shown in an upright inoperative position. Fig. 2 is a similar view showing the marker device down in action. Fig. 3 is a rear perspective view, on an enlarged scale, of the marker device, showing how it is permitted to swing to the rear to prevent breakage of the parts, in the event that the pull-wire gives way. Fig. 4 is a horizontal sectional plan view on an enlarged scale, on the line *a—a* of Fig. 1.

Referring to the drawings: Referring particularly to Figs. 1 and 2, 1 represents the frame of a corn planting machine supported by two pairs of ground and covering wheels 2, and sustaining a driver's seat 1ª. 3—3 represent seed discharging mechanism sustained by the frame in advance of the respective pairs of ground wheels, and discharging respectively into the upper ends of seed tubes 4 provided with forwardly extending furrow-opener runners as usual in these machines. 5 represents a check-shaft which extends transversely across the machine adjacent the seed discharging mechanism, and which is mounted to rock in suitable bearings on the frame, and is operatively connected with the seed discharging mechanisms in such manner, familiar to those skilled in the art, that the rocking motions of the shaft will operate the seed discharging mechanisms. 6—6 represent check-forks connected with the ends of the check-shaft in the manner to be more particularly described hereinafter, and acting when vibrated by the usual check-wire stretched across the field, to impart to the check-shaft a corresponding vibrating or rocking motion. 8 represents a marker device for marking the ground to enable the machine to be properly guided for the next furrow, which marking device is in the form of a marker-rod 8ª provided on its outer end with a marking device proper, in the present instance in the form of a disk 8ᵇ, and connected at its inner end with the frame of the machine in such manner that the rod may be swung up and down respectively to inoperative and operative positions, and may be swung from one side of the machine to the other for action alternately on opposite sides.

My invention relates to the manner of mounting and operating the marker-rod, so that it may be conveniently controlled by the driver in moving the same to an inoperative position at the ends of the rows or for transportation, and in restoring the same to operative position, a description of which will now be given. Fixed to the rear end of the frame, centrally thereof, and adjacent the driver's seat, is a bearing block 9 containing a vertical bearing opening, in which is mounted, so as to rock relatively to the frame about a vertical axis, a marker-rod support 10 which is provided with a rearwardly extending stud or journal 11. Mounted loosely on this stud or journal, is a frame 12 provided with a central socket 13 in which the marker-rod is seated and secured at its inner end and which frame is provided with arms 14 extending outwardly in opposite directions from the axis of the frame, the construction and arrangement being such that the marker-rod is capable of two motions relatively to the frame, one, a motion up and down about a fore and aft horizontal axis coincident with the axis of the journal 11, and the other a motion about a vertical axis coincident with the pivotal axis of the support 10 in the bearing block. Outwardly curved links 15 have their lower ends pivoted respectively to the ends of the arms 14, and have their upper ends pivoted respectively to the lower ends of straps 16, whose upper ends are pivoted as at 17 to a rocking member 18. This rocking member is in the form of a triangular plate whose apex is connected with the lower end of a marker-rod actuating spring 19, the upper end of which spring is connected with a horizontal fixed arm 20 projecting rearwardly at the under side of the driver's seat. The tendency of the spring is to pull upwardly on the rocking member 18, which action, through the medium of the connecting links and straps and the arms 14, will maintain the marker rod yieldingly in a vertical inoperative position as shown in Fig. 1. From this position the marker-rod may be swung downward by the driver against the tension of the spring, in which action the curved links will assume the relative positions indicated in Fig. 3, thereby stretching and placing the spring under tension, the continued downward movement of the rod causing the point of connection of the lowermost link with its arm 14, to pass below and to one side of the axis of the journal 11, with the result that the tension of the spring will act to hold the marker-rod down in operation, with the marker disk traveling on the ground. When the marker-rod is swung by the driver from its upright position to the opposite side of the machine, the action of the links, straps and arms will be reversed, with the result that the rod will be held down yieldingly in operative position on that side of the machine. With the marker-rod thus held down by the spring, but a slight lifting motion is required in order to cause the pivotal connection of the links to "pass center" in the reverse direction, the result being that the spring will act to automatically lift and restore the rod again to its upright inoperative position. For the convenient operation and control of the rod by the driver, a cord 12$^a$ is provided, attached at one end to the rod and extending at its opposite end to within convenient reach of the driver, the cord in the present instance being shown as attached to the driver's seat.

The marker-rod is held to its work substantially at right angles to the direction of travel, by means of a pull wire or cord 22, the rear end of which is suitably attached to the marker-rod near its outer end, and the opposite end of which is provided with an eye 23 running loosely on a fixed arched guide frame or wire 24 sustained by the machine frame and extending transversely of the same from one side of the same to the other.

In the operation of the machine it sometimes occurs that the pull wire will give way, and in such circumstances the pivotal connection of the marker-rod support 10 with the frame on a vertical axis, will permit the marker-rod to swing back on said axis as a center, thereby preventing injurious strains on or breakage of the parts, the links, straps and rocking member 18 in such rearward swinging movement of the rod, turning with the same as shown in Fig. 3. The effect of the construction described is to so connect the up and down movable marker-rod to the frame, that it may swivel relatively thereto about an upright axis, such swiveling motion permitting the rod, when down in an operative position, to swing back in case the pull wire gives way, and thus prevent strain on or breakage of the parts.

In order that when the marker-rod is in an upright inoperative position, as shown in Fig. 1, the swiveling motion of the same may be checked so that the driver will be enabled to swing it down in the proper direction, I provide two stop devices 24$^a$ adapted to coöperate with the curved links 15, in holding the marker-rod against motion about an upright axis. These stop devices are in the form, in the present instance, of two arms projecting outwardly and rearwardly from their inner ends from the bearing block 9, and having their outer free ends disposed in close proximity to the forward sides of the links 15 when the marker-rod is in an upright position. The form, disposition and relation of the arms to the links is such that when the rod is swung down for action, the arms will not interfere with the rearward swing of the rod, in the event of the breakage of the pull wire, as before described.

From the construction described, it will be observed that a single spring is employed which controls the movements of the rod from an upright inoperative position to an operative position to one side of the machine or the other, as the case may be, which spring, due to the form, arrangement and construction of the connecting links and arms, will hold the marker-rod yieldingly down in either of its two positions at one side of the machine or the other, and will also act to automatically elevate the rod from its active position at either side of the machine. The mechanism provides a convenient means within reach of the driver, by which he is enabled to quickly and conveniently swing the marker-rod down at either side of the machine, and by which he is enabled as conveniently to restore the same to its upright inoperative position, when the ends of the rows are reached or in transporting the machine.

Having thus described my invention, what I claim is:

1. In a seeding machine and in combination with a frame, a marker rod pivoted thereto to swing up and down, an actuating spring for said rod, sustained by the frame, and devices connected to the spring and operatively connected to said rod, respectively on opposite sides of the axis of the latter.

2. In a seeding machine and in combination with a frame, a marker rod pivoted thereto to swing up and down, oppositely extending arms on the rod, an actuating spring for the rod, sustained by the frame, and connecting devices between the spring and arms.

3. In a seeding machine and in combination with a frame, a marker rod pivoted thereto to swing up and down, arms on the rod extending outwardly therefrom at its pivotal axis, an actuating spring for the rod, sustained by the frame, and connecting devices between the spring and arms.

4. In a seeding machine and in combination with a frame, a marker rod pivoted thereto to swing up and down, oppositely extending arms on the rod, an actuating spring for the rod, sustained by the frame, links pivoted at one end respectively to said arms and operatively connected at their opposite ends to said spring.

5. In a seeding machine and in combination with a frame, a marker rod pivoted thereto to swing up and down, oppositely extending arms on said rod, an actuating spring for the rod, sustained by the frame, links pivoted at one end respectively to said arms, and straps jointed respectively to the opposite ends of the links and operatively connected with the spring.

6. In a seeding machine and in combination with a frame, a marker rod pivoted thereto to swing up and down, an actuating spring for the rod sustained by the frame, a rocking member connected with the spring, and devices connected to said rocking member and to said rod, respectively on opposite sides of its pivotal axis.

7. In a seeding machine and in combination with a frame, a marker rod pivoted thereto to swing up and down, oppositely extending arms on the rod, an actuating spring for the rod, sustained by the frame, a rocking member connected with the spring, and links operatively connected respectively with said rocking member and with said arm.

8. In a seeding machine and in combination with a frame, a marker rod pivoted thereto to swing up and down, oppositely extending arms on the rod, an actuating spring for the rod, sustained by the frame, a rocking member connected with the spring, links connected at one end respectively with said arms, and straps connecting the opposite ends of said links respectively with the rocking member.

9. In a seeding machine and in combination with a frame, a marker rod pivoted thereto to swing up and down, oppositely extending arms on the rod, an actuating spring for the rod, sustained by the frame, and devices having a jointed connection with the spring and the arms respectively, the points of connection of said devices with the arms being adapted, when the rod is swung down, to pass to one side of the pivotal axis of the rod; whereby the spring will tend to hold the rod down.

10. In a seeding machine and in combination with a frame, a marker rod pivoted thereto to swing up and down, oppositely extending arms on said rod at the axis thereof, an actuating spring for the rod, sustained by the frame, and outwardly curved links pivoted at their lower ends respectively to said arms and operatively connected at their opposite ends to the spring; whereby when the marker rod is swung down, the points of connection of the links and arms will pass the axial center of the arm.

11. In a seeding machine and in combination with a frame, a driver's seat thereon, a marker rod pivoted to the frame to swing up and down, an actuating spring sustained by the frame and acting in a given position of the rod to lift the same, and a lifting cord for moving the marker rod within the influence of the spring, said cord being attached to the rod and extending within reach of the driver occupying the seat.

12. In a seeding machine and in combination with a frame, a driver's seat thereon, a marker rod pivoted to the frame to swing up and down, an actuating spring sustained by the frame and acting in a given position of the rod to lift the same, and a lifting cord moving the rod, within the influence of the spring, said cord being attached respectively to the marker rod and to said seat.

13. In a seeding machine and in combination with a frame, a marker rod supporting-member pivoted thereto on an upright axis, and a marker rod pivoted to said supporting-member to swing up and down.

14. In a seeding machine and in combination with a frame, a marker rod pivoted thereto to swing up and down and rockable relatively to the frame about an upright axis, and means for checking the rocking movement of the rod when the latter is in an upright position.

15. In a seeding machine and in combination with a frame, a marker rod pivoted thereto to swing up and down, said rod being rockable also about a vertical axis, an actuating spring for the rod, sustained by the frame, connecting devices between the rod and spring, and stop members sustained by the frame in position to be engaged by said connecting devices to check the rocking movement of the marker rod when the latter is swung up.

16. In a seeding machine and in combination with a frame, a marker rod support pivoted thereto on a vertical axis, a marker rod pivoted to the support on a horizontal fore and aft axis, oppositely extending arms on the rod at the pivotal axis of the latter, an actuating spring for the rod, sustained by the frame, links connecting the spring respectively with said arms, and stop arms sustained by the frame in position to be engaged by the links to check the movement of the marker rod support when the rod is in an upright position.

In testimony whereof, I have affixed my signature in presence of two witnesses.

ORBIN F. SMITH.

Witnesses:
L. C. BLANDING,
JAMES J. LAMB.

Copies of this patent may be obtained for five cents each, by addressing the "Commissioner of Patents. Washington, D. C."